July 12, 1932.  H. H. BARBER  1,866,834
PORTABLE CONVEYER
Original Filed Jan. 20, 1928  4 Sheets-Sheet 4
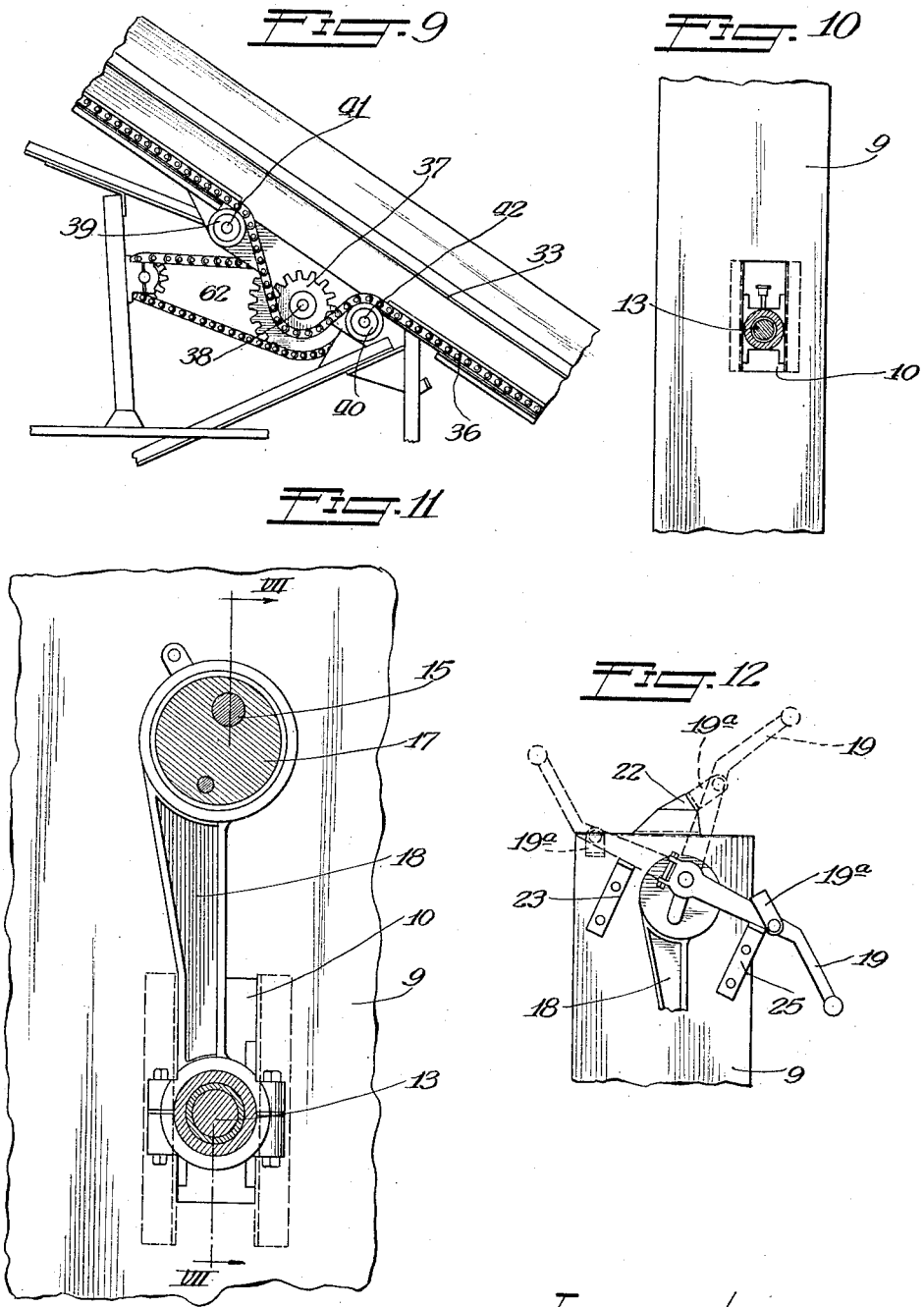

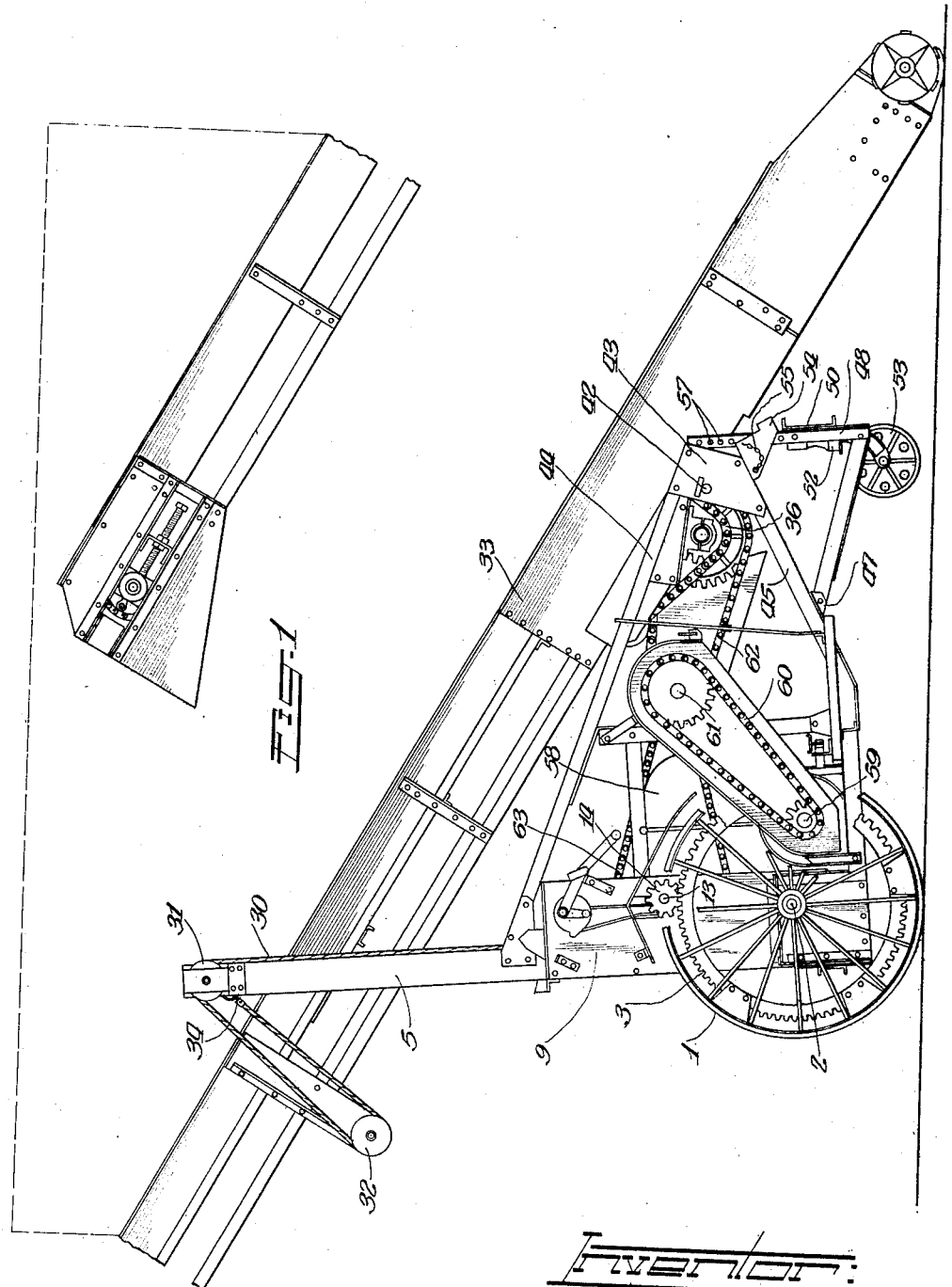

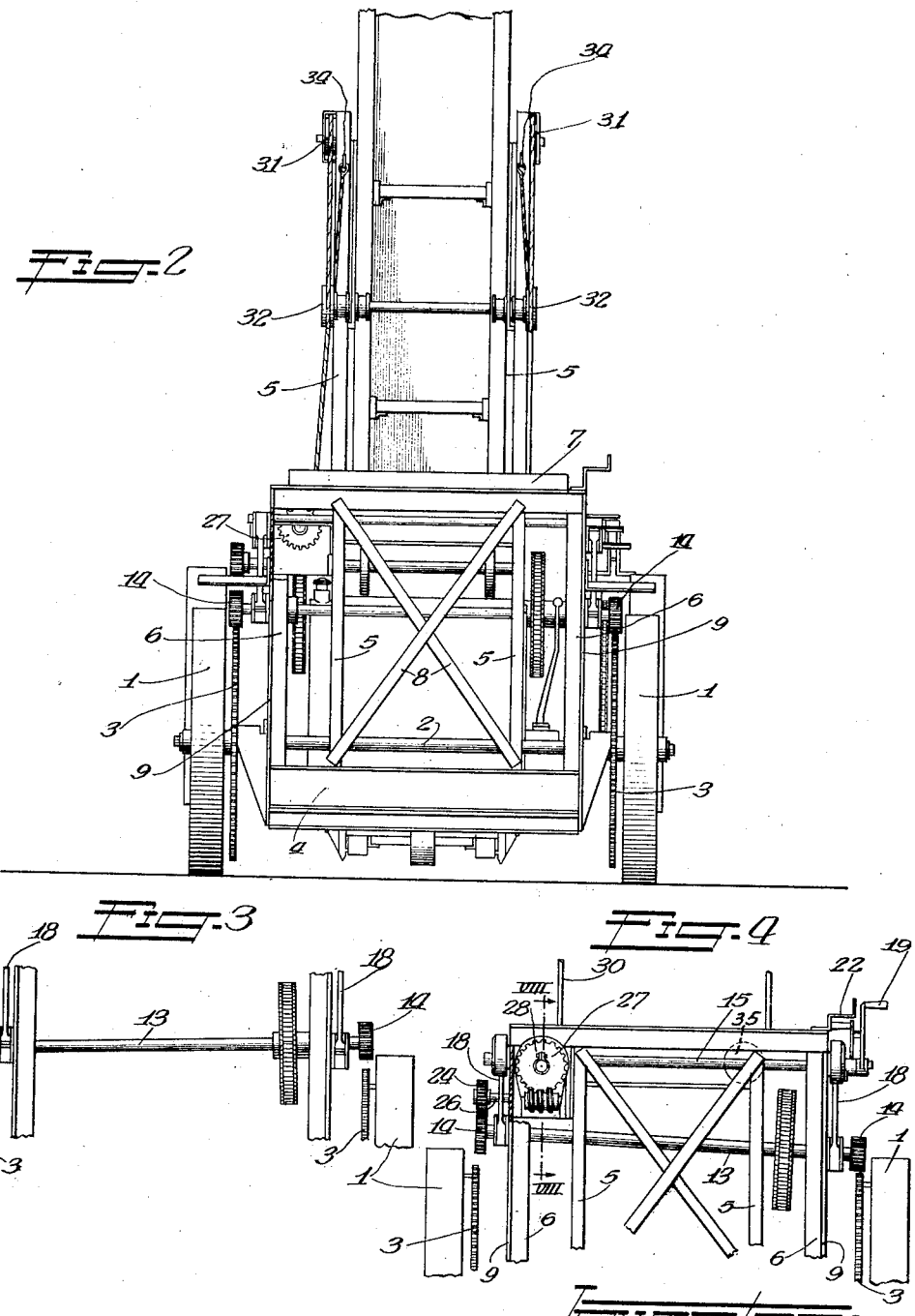

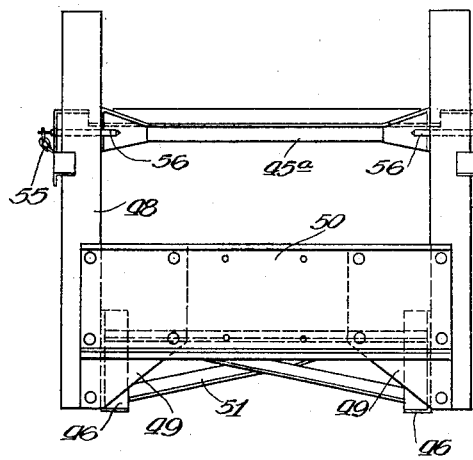
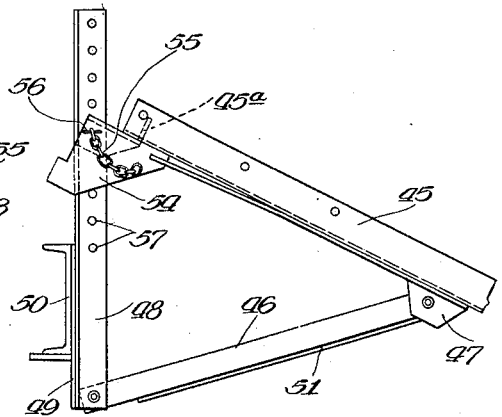
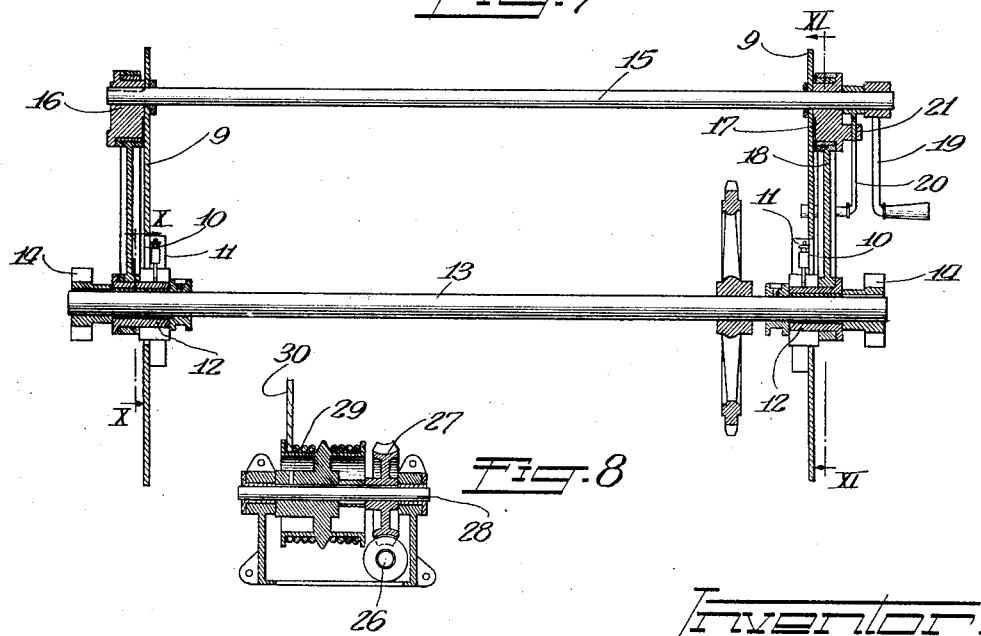

Patented July 12, 1932

1,866,834

UNITED STATES PATENT OFFICE

HARRY H. BARBER, OF AURORA, ILLINOIS, ASSIGNOR TO BARBER-GREENE COMPANY, OF AURORA, ILLINOIS, A CORPORATION OF ILLINOIS

PORTABLE CONVEYER

Original application filed January 20, 1928, Serial No. 248,031. Divided and this application filed May 27, 1929. Serial No. 366,221.

This invention relates to a portable conveyer, and this application is a division of my co-pending application, Serial No. 248,031 filed January 20, 1928.

The invention concerns itself primarily with certain improvements in portable conveyers whereby the conveyer boom may be readily adjusted so that the nose thereof will always have the proper or desired position, and whereby the boom may be elevated or lowered through a novel driving connection with the driving means for the conveyer.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a side elevational view of a portable conveyer involving this invention.

Figure 2 is a rear end elevational view of the conveyer.

Figure 3 is a fragmentary elevational view of the selective drive, showing one driving position.

Figure 4 is a fragmentary elevational view of the selective drive and associated parts illustrating a different driving position.

Figure 5 is a fragmentary front and enlarged elevational view of the adjustable frame for supporting the front end of the boom.

Figure 6 is a side elevational view of the structure shown in Figure 5.

Figure 7 is an enlarged sectional view taken upon the line VII—VII of Figure 11.

Figure 8 is an enlarged sectional view taken upon the line VIII—VIII of Figure 4.

Figure 9 is an enlarged fragmentary elevational view of the drive for the conveyer chain.

Figure 10 is an enlarged sectional view taken upon the line X—X of Figure 7.

Figure 11 is an enlarged sectional view taken upon the line XI—XI of Figure 7, looking in the direction of the arrows.

Figure 12 is an enlarged elevational view of the control levers and stops for the selective drive.

The portable conveyer is mounted upon a pair of wheels 1 which are supported upon an axle 2, which carries the frame of the conveyer. Each wheel 1 has a gear 3 on its hub. The gears 3 are of slightly less circumference than the rims of the wheels.

The frame of the conveyer truck, consists of a transverse member 4 (Figure 2) attached to the axle 2. A pair of spaced standards 5 rise from the frame member 4, for supporting the hoisting cables for the conveyer boom. A pair of upright angle members 6 (Figure 2) are also supported by the transverse frame member 4. The members 5 and 6 are connected by an upper transverse member 7 which is braced by the cross member 8.

Each angle member 6 has a plate 9 attached to its forwardly extending flange. Each plate 9 has a slot 10 and along the vertical margins of these slots extend the outstanding flanges 11 (Figure 7) of angle members secured to said plate. The slot 10 in connection with the flanges 11 provide guide-ways for slidably receiving shaft bearings 12. The selective drive or power shaft 13 is mounted in these bearings. It will be noted that each end of the selective drive shaft 13 carries a pinion 14 located in the plane of a gear 3.

Due to the slidable feature of the bearing 12, the selector shaft 13 may be elevated or tilted as shown in Figures 3 and 4 for propelling or steering the conveyer truck. Suitable mechanism has been provided for controlling the adjustments of the shaft 13. The illustrated embodiment of this mechanism consists of a shaft 15 journalled in the upper portions of the plates 9 and an eccentric 16 fixedly secured upon said shaft, and an eccentric 17 loose upon said shaft; said eccentrics being connected by suitable hangers 18 with the bearings 12 of the shaft 13. It will be noted that each hanger 18 has a cylindrical bearing hub at each end. One bearing hub of each hanger rotatably receives one eccentric while the other hub receives one of the bearings 12.

A lever or crank arm 19 is rigidly attached upon one end of the shaft 15 whereby said shaft may be rotated for rotating the eccentric 16 which is fixed thereon. A second crank or lever 20 is loosely mounted upon said shaft and is connected to the eccentric 17 as indicated at 21. A swingable stop lug 19a (Figure 12) is pivoted upon the lever 19 and is adapted to strike a stop 22 when said lever is swung upwardly as shown in dotted lines, to limit its movement. This position of the lever 19 will shift the left hand gear on shaft 13 to neutral position. The lug 19a may then be swung upwardly to disengage the stop 22 and the lever 19 may then be swung further until it strikes a stop 23, in which position the left hand pinion 14 will mesh with a gear 24 (Figure 4) for operating the hoisting cable, as will later more fully appear.

The levers 19 and 20 may be operated so that both pinions 14 engage the driving gears 3 on the truck wheels 1, as shown in Figure 2. In such positions, the conveyer truck may be driven forwardly in a straight line. When it is desired to steer the truck, one of the levers 19 or 20 is swung upwardly until it strikes the stop 22, whereby one of the gears is elevated. In Figure 3, the right hand pinion 14 is shown in such elevated position, the lever 20 having been swung upwardly against the stop 22. When both levers 19 and 20 are swung against the stop 22, both pinions 14 will be in neutral position. From this position, the swingable stop lug 19a on lever 19 may be swung out of the path of the lug 22, allowing said lever 19 to be swung into engagement with the lug 23, for elevating pinion 14 into mesh with a gear 24, as previously explained and as shown in Figure 4. If desirable, a stop lug 25 may be positioned upon plate 19 for limiting the downward movement of the two control levers 19 and 20 and arresting the same when the pinions 14 are properly in mesh with the driving gears 3.

The aforementioned gear 24 is secured upon a shaft 26 which is provided with a worm that operates a worm gear 27 secured upon a shaft 28 journalled in a suitable bearing support on the frame of the truck. A suitable winding drum 29 is secured upon the shaft 28 and a cable 30 is wound around this drum, one reach or branch of the cable extending upwardly over a guide pulley 31 upon the top of a standard 5, then down around a guide pulley 32 secured upon the boom 33. From the pulley 32 this branch of the cable extends to the said standard where it is anchored, as indicated at 34. The other branch of this cable extends transversely from the drum 29 to a guide pulley 35 upon the opposite side of the machine. From the guide pulley 35, this branch of the cable extends upwardly along the standard 5 and over a guide pulley 31 upon the top of such member, thence around a guide pulley 32 on the boom, thence to the anchor 34 on the said standard 5. This single cable will always balance the boom as it is raised or lowered.

The boom 33, which may be of usual construction, supports an endless conveyer comprising the driving chains 36 which are trained over sprocket wheels 37 (only one of which is shown) upon a shaft 38 journalled in suitable bearings upon the bottom of the boom. The bottom of the boom has an opening at the shaft 38 and the conveyer chains 36 are looped downwardly for passing around the sprockets 37, which are located intermediate the ends of the conveyer. Suitable guide pulleys 39 and 40 guide the chains to and from the sprockets 37 and maintain the same in operative relation with said sprockets. The guide pulleys 39 and 40 are respectively mounted upon shafts 41 and 42 journalled upon the bottom of the boom. The ends of the shaft 42 project beyond the pulleys 40 and extend through gusset plates 43 on the frame, whereby the boom becomes pivoted to the frame upon the axis of shaft 42. This construction eliminates the long sprocket chains that usually extended to the driving shaft for the head sprockets at the upper end of the boom.

The gusset plates 43 are attached to frame members 44 and to frame members 45, which frame members comprise a part of the truck frame as shown. Only one frame member 44 and one frame member 45 on one side of the machine can be seen. It will, however, be understood that the same are duplicated upon the other side of the machine. The frame members 45 are preferably connected by a transverse brace 45a, as shown in Figures 5 and 6.

An adjustable frame is pivoted to the frame members 45. This adjustable frame comprises braces 46 pivotally connected at one end to gusset plates 47 on the frame members 45. The free ends of the braces 46 are pivoted respectively to upright angle bars 48 (Figures 5 and 6), which are rigidly connected by suitable cross members. To this end, gusset plates 49 are attached to the member 48, and a channel section 50 is riveted to the gusset and the upright members. The members 46 are also connected by cross braces 51 as shown in Figure 5. The channel section 50 supports a bearing socket 52 in which the yoke of a pilot wheel 53 is swivelled, upon which the adjustable frame is supported.

To the frame members 45, which are in the form of angle bars, are secured gusset plates 54, which overlap the upright members 48 of the adjustable frame. Each gusset plate 54 has a chain 55 attached thereto and each chain carries a coupling pin 56. Each upright 48 is provided with a series of apertures 57 for receiving the coupling pins.

Obviously, as the boom is supported upon the main frame of the conveyer truck by means of the shaft 42, and as the elevation of the main frame is determined by the adjustment of the adjustable frame, the front end or nose of the boom may be supported as desired. By raising or lowering the coupling pins, the nose of the boom may be adjusted to rest upon the ground or above the ground, as desired.

As the forward ends of the boom is connected to the frame by the shaft 42, it will be impossible to tip the frame upwardly with respect to the axis of the wheels 1, on account of the weight of the boom.

The conveyer truck carries a power plant, which in the present instance, is shown as an internal combustion engine 50 having a driving shaft 59, which is geared by sprocket gearing 16 to a driven shaft 61. The shaft 61 is geared by sprocket gearing 62 to shaft 38 for driving the endless conveyer. The shaft 61 is also geared by a sprocket gearing 63 to the selector shaft 13 for driving the conveyer from place to place.

From the foregoing, it will be apparent that a greatly improved portable conveyer has been provided, which possesses simple driving and steering mechanism which also controls the elevation of the conveyer boom. It will be appreciated that in providing an adjustable frame upon the front end of the boom, it is possible to support the nose of the boom at any desired elevation. Consequently, in soft ground, it is unnecessary to have the nose of the boom sink into the earth to such an extent as to interfere with the traveling buckets on the conveyer.

I am aware that many changes may be made, and numerous details of construction may be varied through a wide range without departing from the principles of this invention, and I therefore, do not purpose limiting the patent granted hereon otherwise than necessitated by the prior art.

I claim as my invention:

1. In a portable conveyer, including a pair of traction wheels, a gear secured to each wheel, a frame, a boom thereon, a transverse shaft, pinions thereon for engaging said gears, means for selectively engaging said pinions and gears, and operating mechanism for varying the inclination of the boom adapted to be selectively driven from said transverse shaft.

2. In a portable conveyer, including a frame a boom thereon, a pair of ground wheels, a gear on each ground wheel, a power shaft, pinions upon said power shaft adapted for meshing relation with said gear, cable means for raising and lowering the boom including a winding drum, gearing for operating said winding drum, and means for selectively engaging said pinions with said gears or gearing.

3. In a portable conveyer, including a frame and a pair of ground wheels, a boom on said frame, a selective drive for operating said ground wheels, and means for varying the inclination of the boom adapted to be selectively operated by said selective drive.

In testimony whereof I have hereunto subscribed my name at Aurora, Kane County, Illinois.

HARRY H. BARBER.